Aug. 10, 1926.
1,595,468
F. D. HOLDSWORTH
VALVE MECHANISM
Original Filed Oct. 8, 1921
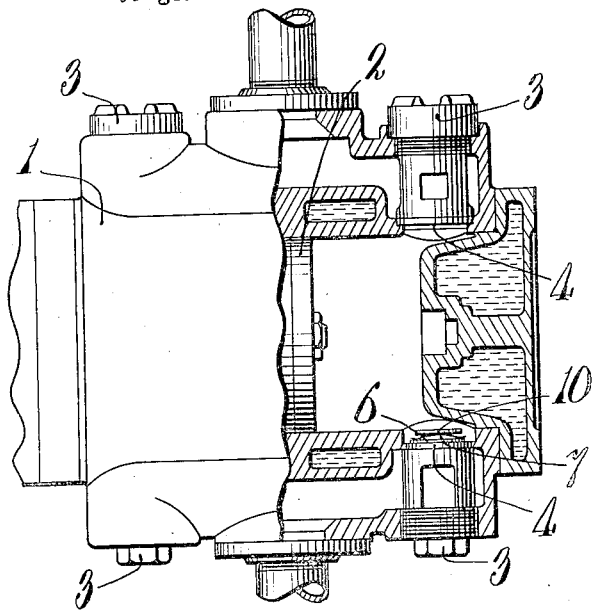
Fig. 1.
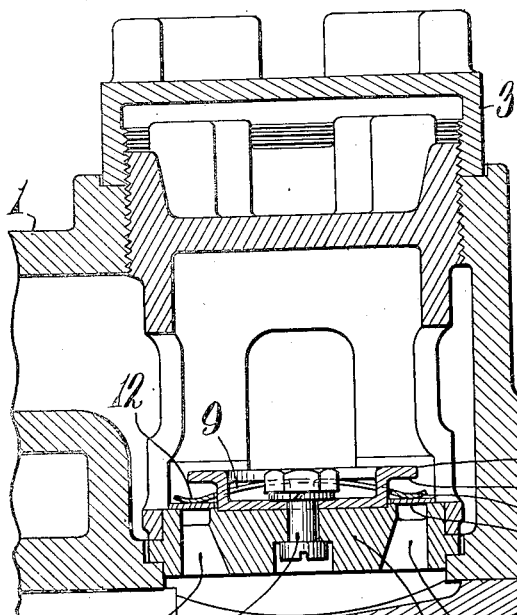
Fig. 2.
Fig. 3.
Fig. 4.
Fig. 5.
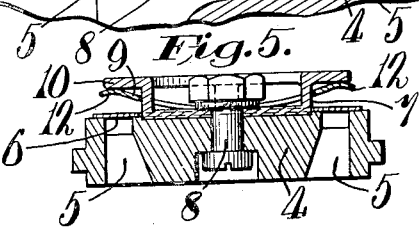
Inventor:
Fred D. Holdsworth.
by
atty.

Patented Aug. 10, 1926.

1,595,468

UNITED STATES PATENT OFFICE.

FRED D. HOLDSWORTH, OF CLAREMONT, NEW HAMPSHIRE, ASSIGNOR TO SULLIVAN MACHINERY COMPANY, A CORPORATION OF MASSACHUSETTS,

VALVE MECHANISM.

Continuation of application Serial No. 506,465, filed October 8, 1921. This application filed September 10, 1924. Serial No. 736,987. Renewed September 26, 1925.

My invention relates to valve mechanism. It has for its object to provide an improved valve mechanism and more especially an improved valve mechanism for pumps, compressors or the like. A further object of my invention is to provide an improved valve mechanism of the type utilizing a transversely flexed spring whereby breakage of the valve spring is eliminated.

In the accompanying drawings I have shown for purposes of illustration two embodiments which my invention may assume in practice.

In these drawings:—

Fig. 1 is a partial sectional view of the compressor cylinder equipped with one form of my improvement.

Fig. 2 is a detail sectional view of the valve cage in position in the cylinder.

Fig. 3 is a plan view of the valve.

Fig. 4 comprises plan and side elevations of the valve spring.

Fig. 5 is a detail view showing a modified form of spring and valve arrangement.

In this illustrative disclosure I have shown a compressor of standard construction including a cylinder 1 having a piston 2 movable therein and equipped with inlet and discharge valve mechanisms 3 in a usual manner, each of which is preferably in the form of a cage housing a valve mechanism of the general form shown in the illustrative discharge valve shown in detail in Fig. 2, and comprising a seat 4 having an annular series of ports 5 therein covered by an annular and preferably rigid valve 6 movable relative to an annular flanged guard, guide, or cooperating housing member 7 held in place on the seat by suitable clamping means 8 and having a transversely flexed generally annular spring 9 operating between the valve 6 and a horizontally extending annular guard or stop 10 on the guide member 7, and normally seating the valve.

In my improved construction it will be noted that the transversely flexed valve spring 9 is cut away as at 11 on opposite sides thereof, as shown in Fig. 4, and on opposite sides of a diametric line parallel to the axis of transverse flexure of the valve spring, in such a manner as, by decreasing the cross section of metal at these points, to increase the flexibility of these portions of the valve spring relative to that of the intermediate portion, and herein form oppositely disposed extensions of reduced width 12 which are preferably slightly bent upward to provide a line contact with the valve.

As a result of my improvement, it will be noted that instead of concentrating the deflection or bending action at a point along a diametric line parallel to the axis of transverse flexure of the valve spring as would tend to be the case in a valve of true annular form, the deflection is distributed from the line of transverse flexure toward the ends of the valve in such a manner as to eliminate possible fatigue of the metal along the line mentioned and any breaking of the valve springs which may tend to result therefrom, a valve spring thus being produced which, through the elimination of the concentration of stresses, has a materially longer life.

In the manufacture of my improved springs, the springs are preferably cut out by dies from the flat strips of sheet metal prior to flexing, although if desired the same may be formed by grinding away portions of the metal at the points indicated in such a manner as to reduce the cross section at those points and thereby increase the flexibility as compared with corresponding points in a spring not so cut away.

In the use of my improvement, it will also be evident that if desired, instead of having the ends of the valve spring engage the valve and the intermediate portion of the spring engage the guard, the spring may be reversed, having its ends engage the guard and its intermediate portion engage the valve, it being understood that in such a construction the guard will be slightly increased in diameter to permit the desired contact as shown in Fig. 5.

This application is a substitute for my copending application, Ser. No. 506,465, filed Oct. 8, 1921, valve mechanism.

While I have in this application specifically described two embodiments which my invention may assume in practice, it will be understood that these have been shown for purposes of illustration and that the invention may be modified and embodied in various other forms without departing from its spirit or the scope of the appended claims.

What I claim as new and desire to secure by Letters Patent is:—

1. In a valve mechanism, a ported seat member, a spaced abutment member, a valve adapted to cooperate with said seat member, and a spring between said valve and abutment engaging one of the same along points in a single straight line and the other along points in a pair of parallel straight lines at opposite sides of said first mentioned line and comprising a bowed member initially uniform in thickness and in shape corresponding to the shape of said valve but cut away wholly exteriorly to an increasing extent at each side of said first mentioned line from points adjacent said first mentioned line to points adjacent said second mentioned lines.

2. In a valve mechanism, a ported seat member, a spaced abutment member, a valve adapted to cooperate with said seat member, and a spring between said valve and abutment engaging one of the same along points in a single straight line and the other along points in a pair of parallel straight lines at opposite sides of said first mentioned line and comprising a bowed member initially uniform in thickness and in shape corresponding to the shape of said valve but cut away wholly exteriorly to an increasing extent at each side of said first mentioned line from points adjacent said first mentioned line to points adjacent said second mentioned lines and provided with upturned portions beyond said second mentioned lines.

3. In a valve mechanism, a ported valve housing, an annular valve disposed over a port therein, and a transversely flexed generally annular spring, imperforate between its inner and outer peripheries normally seating said valve and cut away to provide portions at opposite sides of the intermediate portion thereof of greater flexibility than a transversely bowed true annulus of identical thickness and material.

4. In a valve mechanism, a ported valve housing, an annular valve disposed over a port therein, and a transversely flexed generally annular spring, imperforate between its inner and outer peripheries normally seating said valve and having portions at opposite sides of the intermediate portion thereof of reduced cross section as compared with corresponding sections through a truly annular spring of uniform thickness.

5. In a valve mechanism, a ported valve housing, an annular valve disposed over a port therein, and a transversely flexed generally annular spring normally seating said valve and having upturned portions on opposite sides of the intermediate portion thereof and of less width than a corresponding segment of a truly annular spring.

6. In a valve mechanism, a ported valve housing, an annular valve disposed over a port therein, and a transversely flexed generally annular spring, imperforate between its inner and outer peripheries normally seating said valve and having its intermediate portion of substantially uniform cross section and oppositely disposed relatively narrow upturned ends connected thereto by flexible portions of reduced cross section as compared with corresponding sections through a truly annular spring of uniform thickness.

7. In a valve mechanism, a ported seat member, a spaced abutment member, a valve adapted to cooperate with said seat member, and a spring between said valve and abutment having engagement with one of the same at a plurality of points lying in a single straight line extending transversely of said spring, the most remote points of such contact being spaced sufficiently to prevent lateral tilting of said spring, said spring engaging the other element contacted thereby at points on opposite sides of said straight line, and comprising a bowed member initially uniform in thickness and in shape corresponding to the shape of said valve but cut away wholly exteriorly to an increasing extent at each side of said line from points adjacent the latter to points in lines parallel to said first line and including said points of contact with the other element contacted by said spring.

In testimony whereof I affix my signature.

FRED D. HOLDSWORTH.